United States Patent
Kirmse et al.

(10) Patent No.: US 12,064,926 B2
(45) Date of Patent: Aug. 20, 2024

(54) PACKAGING DEVICE

(71) Applicant: MULTIVAC SEPP HAGGENMUELLER SE & CO. KG, Wolfertschwenden (DE)

(72) Inventors: Herbert Kirmse, Wolfertschwenden (DE); Michael Raedler, Kempten (DE); Christoph Zettler, Kempten (DE)

(73) Assignee: Multivac Sepp Haggenmueller SE & Co. KG, Wolfertschwenden (DE)

( * ) Notice: Subject to any disclaimer, the term of this patent is extended or adjusted under 35 U.S.C. 154(b) by 41 days.

(21) Appl. No.: 17/530,272

(22) Filed: Nov. 18, 2021

(65) Prior Publication Data

US 2022/0152942 A1     May 19, 2022

(30) Foreign Application Priority Data

Nov. 19, 2020 (DE) .......................... 102020130654.7

(51) Int. Cl.
*B29C 65/00* (2006.01)
*B29C 65/18* (2006.01)
(Continued)

(52) U.S. Cl.
CPC ........ *B29C 66/43121* (2013.01); *B29C 65/18* (2013.01); *B29C 66/0242* (2013.01);
(Continued)

(58) Field of Classification Search
CPC ....... B65B 9/12; B65B 31/024; B65B 31/025; B65B 31/028; B65B 51/146; B65B 5/026
(Continued)

(56) References Cited

U.S. PATENT DOCUMENTS 4,009,552 A    3/1977 Schlachter
5,555,705 A    9/1996 Balcombe
(Continued)

FOREIGN PATENT DOCUMENTS

DE    2 323 409 B    6/1974
DE    2 322 943 A    11/1974
(Continued)

OTHER PUBLICATIONS

Thermoforming Definition, p. 364, Section 10.20.2.4 (Year: 2012).*
(Continued)

*Primary Examiner* — Anne Marie Antonucci
*Assistant Examiner* — Luis G Del Valle
(74) *Attorney, Agent, or Firm* — Brooks Kushman, P.C.

(57) ABSTRACT

The disclosure refers to a packaging device for manufacturing a packaging for a foodstuff. In particular, the packaging may include a trough-shaped lower packaging part and a top film which can be sealed together along their edges by means of a sealing tool of the packaging device. In order to improve a packaging device completely without evacuation or by evacuation in a simple and inexpensive manner with only a slight negative pressure in such a way that sufficient vapor purging is possible and at the same time cooling of the foodstuff before sealing or excessive degassing of the foodstuff does not take place, vapor can be introduced under pressure between the lower packaging part and the top film at at least one vapor entry point before sealing and can be released into the surrounding atmosphere at an outlet point from the packaging.

19 Claims, 1 Drawing Sheet

(51) Int. Cl.
  *B65B 9/12* (2006.01)
  *B65B 31/02* (2006.01)
  *B65B 51/14* (2006.01)
  *B65B 51/32* (2006.01)
  *B65B 55/24* (2006.01)

(52) U.S. Cl.
  CPC ...... *B29C 66/0342* (2013.01); *B29C 66/1122* (2013.01); *B29C 66/3494* (2013.01); *B29C 66/71* (2013.01); *B29C 66/723* (2013.01); *B29C 66/7373* (2013.01); *B29C 66/81422* (2013.01); *B29C 66/81811* (2013.01); *B29C 66/8322* (2013.01); *B29C 66/849* (2013.01); *B29C 66/91421* (2013.01); *B29C 66/91445* (2013.01); *B29C 66/91951* (2013.01); *B29C 66/92445* (2013.01); *B29C 66/944* (2013.01); *B29C 66/9672* (2013.01); *B65B 9/12* (2013.01); *B65B 31/024* (2013.01); *B65B 51/146* (2013.01); *B65B 51/32* (2013.01); *B65B 55/24* (2013.01)

(58) Field of Classification Search
  USPC .......................................................... 53/285
  See application file for complete search history.

(56) References Cited

U.S. PATENT DOCUMENTS

| | | | | |
|---|---|---|---|---|
| 2005/0257501 | A1* | 11/2005 | Natterer | B65B 31/028 53/329.3 |
| 2011/0271650 | A1* | 11/2011 | Ehrmann | B65B 31/028 53/510 |
| 2012/0110956 | A1 | 5/2012 | Miller | |
| 2012/0201481 | A1* | 8/2012 | Mondry | B65B 25/08 383/105 |
| 2014/0260086 | A1* | 9/2014 | Schiavina | B65B 31/028 53/97 |
| 2017/0210042 | A1* | 7/2017 | Arning | B30B 15/022 |
| 2019/0351456 | A1* | 11/2019 | Palumbo | B65B 31/043 |
| 2020/0079635 | A1* | 3/2020 | Yuse | B67C 7/0053 |
| 2022/0063853 | A1* | 3/2022 | Binacchi | B65B 43/54 |

FOREIGN PATENT DOCUMENTS

| | | |
|---|---|---|
| DE | 2322943 A1 | 11/1974 |
| DE | 24 30 497 A1 | 1/1976 |
| DE | 42 24 926 A1 | 2/1994 |
| DE | 102005048491 B4 | 4/2008 |
| DE | 10 2010 048 401 A1 | 4/2012 |
| DE | 102011010601 B4 | 8/2012 |
| DE | 20 2018 101 469 U1 | 6/2019 |
| DE | 10 2018 108 640 A1 | 10/2019 |
| WO | 2020058278 A2 | 3/2020 |

OTHER PUBLICATIONS

Extended European Search Report for Application No. EP 21209047.6, dated Apr. 11, 2022, 7 Pages.

German Search Report Dated Jun. 17, 2021, Application No. 10 2020 130 654.7, Applicant MULTIVAC Sepp Haggenmueller SE & Co. KG, 5 Pages.

* cited by examiner

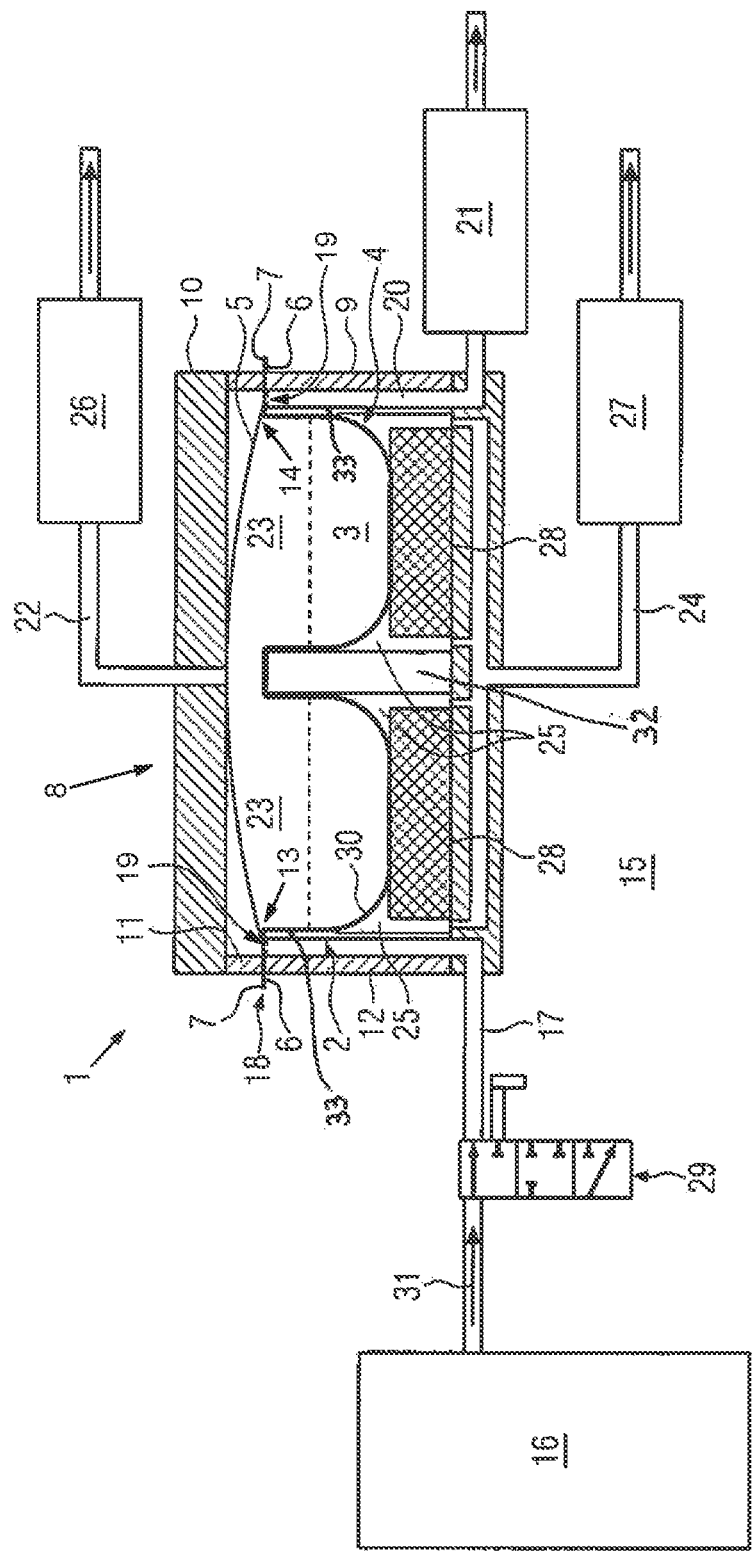

PACKAGING DEVICE

CROSS-REFERENCE TO RELATED APPLICATIONS

This application claims foreign priority benefits under 35 U.S.C. § 119(a)-(d) to German patent application number DE 10 2020 130 654.7, filed Nov. 19, 2020, which is incorporated by reference in its entirety.

TECHNICAL FIELD

The disclosure refers to a packaging device for manufacturing a packaging for a foodstuff, said packaging in particular comprising a trough-shaped lower packaging part and a top film, which can be sealed to one another along their respective edges by means of a sealing tool of the packaging device.

BACKGROUND

Such a packaging device is described, for example, in DE 20 2018 101 469 U1. The packaging device is part of a thermoforming packaging machine comprising a forming station, a depositing section, a sealing station and a cutting station. The sealing station substantially corresponds to the packaging device described above. In the forming station, trough-shaped packaging parts are produced from a bottom film web by means of forming tools. In the sealing station, a top film is fed and the trough-shaped packaging bottom parts are sealed by means of the top film by a sealing tool sealing the packaging part and the top film together along their edges. Previously, an appropriate foodstuff was inserted into the trough-shaped packaging part. This is done along a depositing section, along which a foodstuff is inserted as the product to be packaged in each trough-shaped packaging bottom part before sealing.

In no way does a specific treatment of the packaging or the foodstuff take place in DE 20 2018 101 469 U1. Instead, only the sealing of the trough-shaped lower packaging part and the top film takes place in the sealing station.

DE 10 2010 048 401 A1 also discloses a packaging device in which a product or foodstuff is arranged in a bag and the bag is closed at a bag neck facing its opening by means of a sealing rail and counter-pressure bar. It is possible for a modified atmosphere to be generated inside the bag, for vapor purging to take place or for evacuation to take place. As a rule, the bag is evacuated shortly before sealing, for example by means of a liquid ring pump or the like. If the bag was previously vapor-purged, the resulting vapor-air mixture in the bag is extracted during evacuation.

Vapor purging has a number of advantages. For example, there is no need to cool the foodstuff before the actual sealing process. The introduced vapor displaces air, and in particular oxygen, from the packaging and then the vapor-air mixture is withdrawn by suction by applying a vacuum. The vapor purging can also kill any surface germs on the food.

With the previous system with vapor purging, however, it has been found that the pumps cannot be regulated sufficiently in their negative pressure or are not suitable for sucking in water vapor. Other pumps, which may not have these disadvantages, are very expensive and therefore cannot be used. Problems also arose when introducing the vapor or connecting a pump to the packaging.

SUMMARY

The present disclosure is therefore based on the object of improving a packaging device completely without evacuation or by means of evacuation in a simple and inexpensive manner with only a slight negative pressure to the effect that sufficient vapor purging is possible and at the same time cooling of the foodstuff before sealing or excessive degassing of the foodstuff does not take place.

This object may be solved by a packaging device according to the disclosure.

According to the disclosure, it is advantageous if, prior to sealing under pressure, vapor can be introduced at least at a vapor entry point between the lower packaging part and the top film and can be released into the surrounding atmosphere through an outlet opening in the packaging. The vapor thus moves through the packaging, which has not yet been sealed, from the vapor entry point to the outlet point, where it exits into the surrounding atmosphere. Vapor purging of the packaging is thus accomplished in a simple manner without the need for expensive pumps or the like. The food can be packaged while hot and at the same time there is no degassing of the foodstuff by pumping. A vacuum pump with correspondingly high costs is not used.

In principle, the purging of the packaging with vapor is only effected by the pressure difference between the supply of vapor at the vapor inlet point and the atmospheric pressure at the outlet point.

Furthermore, it may be considered advantageous if a vapor source is associated with the packaging device and connected to, in particular, the vapor inlet point via a vapor supply line. The vapor source is thus directly associated with the packaging device and is generally arranged close to the vapor inlet point. A vapor supply line extends from the vapor source to the vapor entry point. The supply line may extend partially outside the sealing tool, but also partially inside the sealing tool to be connected to the vapor entry point in this way.

In particular, the lower packaging part can have an edge strip with an edge strip perforation at least in places. This is arranged in an edge region of the trough-shaped lower packaging part and can be removed in a later step after the top film has been sealed on, leaving a sealed edge of the lower packaging part and top film. This edge perforation can form the vapor entry point before sealing, so that no additional opening needs to be provided between the lower packaging part and the top film.

In this context, it may further prove advantageous if a further edge strip perforation of the lower packaging part forms the outlet point.

Thus, in accordance with the disclosure, no specific openings are provided between the lower packaging part and the top film, since both the supply of the vapor and the discharge to the atmosphere are simply effected via the corresponding edge perforations of the edge of the lower packaging part.

In the simplest case, the edge strip perforations for the vapor entry point and the outlet point can be opposite each other relative to the packaging, i.e., a corresponding edge strip perforation of two opposite edge strips of the lower packaging part is used.

It is conceivable that the outlet point is directly connected to the surrounding atmosphere. It is also possible that the outlet point is connected to the surrounding atmosphere via a discharge line. This discharge line may be at least partially formed in the sealing tool to establish the connection from the outlet point of the packaging to the surrounding atmosphere.

According to the present disclosure, in order to possibly enable a certain negative pressure in the packaging, which can be advantageous for improved sealing of the lower packaging part and top film as well as improved vapor purging, a Venturi nozzle can be arranged in the discharge line as a negative pressure means or at least be assigned to this discharge line. The Venturi nozzle serves to create a greater pressure difference between the vapor inlet point and the outlet point, which can, for example, support purging with vapor and at the same time create a certain negative pressure in the packaging for improved sealing. For example, the Venturi nozzle can only be used if there is also a supply of vapor to the packaging.

In order to ensure that the vapor can also be well distributed over several tracks of packagings of the packaging device, it may be advantageous if the packaging has as large a cross-section as possible for the vapor to flow through above the foodstuff or around the foodstuff. In order to allow such a large space as possible, the sealing tool may comprise a suction line which creates a negative pressure between the sealing tool and the top film for creating a space between the top film and the food surface in the lower packaging part. This space then forms the correspondingly large space for vapor to flow through the packaging. The large space allows a sufficient amount of vapor to pass through in a rapid manner. This allows a high cycle rate in the packaging device for throughput of a corresponding number of packagings. Likewise, a better quality packaging can be produced.

The negative pressure can be produced, for example, by a pump or the like, in which case no water vapor has to be pumped out, only air contained between the sealing tool and the top film.

Furthermore, it may prove advantageous if vapor is largely prevented from flowing into the sealing tool below the bottom film and instead the bottom film rests directly on the sealing tool or the seal, so that no air is present between the two. For this purpose, the sealing tool may comprise an extraction line connecting a space between the sealing tool and the lower packaging part in particular to the surrounding atmosphere. The arrangement of the lower packaging part in the sealing tool and the weight of the foodstuff can ensure that substantially air is released from this intermediate space to the surrounding atmosphere.

However, it is usually advantageous if, if necessary, a Venturi nozzle is arranged in each of the suction line and/or the extraction line. Through the Venturi nozzle, the top film is sucked upwards in order to create the space safely or to draw the lower packaging part towards the sealing tool by evacuating the corresponding gap. These latter measures further ensure that vapor enters the packaging completely through the edge strip perforation and does not flow through either above the top film or below the lower packaging part. Instead, a sufficiently large space is created between the top film and the food surface and a clean contact of the lower packaging part on the sealing tool is ensured. The latter is also supported by the mass of the foodstuff in the packaging. However, this mass may not be evenly distributed or may not be sufficiently heavy.

In order to prevent holes of the edge strip perforation from widening too much due to a combination of thermal stress by the vapor and mechanical stress by the mass of the foodstuff, a support device may be formed at least in places in the sealing tool for supporting the lower packaging part, i.e., the sealing tool supports the lower packaging part so that the lower packaging part rests on the support device and thereby the stress on the holes of the edge strip perforation is prevented both on the side of the vapor entry point and the outlet point.

It may further prove advantageous if a switching valve, in particular a three-way valve, is arranged in the vapor supply line. By simply switching this valve, it is then possible on the one hand to supply vapor to the vapor inlet point, to interrupt the supply of vapor or to supply vapor to another line. This other line can serve, for example, to conduct the vapor through the packaging in the reverse manner, i.e., that the vapor supply is effected via the outlet point and the vapor outlet is effected via the vapor inlet point. Thus, by appropriately switching the valve, the packaging can be flooded with vapor in different directions. It is also possible for the other line to be connected to, for example, another packaging device, so that different packaging devices can be supplied in a suitably timed manner by means of a vapor source. Similarly, for example, a two-way valve may be arranged to supply vapor only and to interrupt the supply of vapor.

In the simplest case, vapor can be supplied in the form of water vapor, so the vapor source can be a water vapor source.

According to the disclosure, it is also possible that a plurality of packagings are arranged one behind the other and/or next to each other in the packaging device. These packagings can be vapor purged in the manner described above.

The packaging device can further be configured to manufacture the lower packaging part itself by thermoforming a bottom film. Vapor purging then takes place after the foodstuff has been inserted into the lower packaging part produced from the bottom film.

According to the disclosure, a packaging device is thus obtained which provides a low-cost system for vapor purging. For this purpose, it is usually sufficient to carry out such a vapor purging without any negative pressure, i.e., without active suction of the vapor. If an appropriate negative pressure or additional suction is required, this is done by means of simple Venturi nozzles without the arrangement of expensive vacuum pumps or the like. Venturi nozzles also ensure that they are not damaged in any way by water vapor being sucked in.

BRIEF DESCRIPTION OF THE DRAWINGS

In the following, an advantageous embodiment of the disclosure will be described in more detail with reference to the accompanying FIGURE.

FIG. 1 shows a schematic diagram of a packaging device according to the disclosure.

DETAILED DESCRIPTION

FIG. 1 shows a schematic diagram of a packaging device 1 according to the disclosure as part of a device with, for example, a forming station, a depositing section, a sealing station and a cutting station. The packaging device 1 according to the disclosure corresponds to the sealing station.

The packaging device 1 is shown in cross-section perpendicular to the transport direction of the packagings 2. The packaging device 1 may comprise an upper tool part 10 as a sealing tool 8 and a lower tool part 9 as a support device. The packaging device may alternatively comprise a sealing tool 8, and the sealing tool 8 may comprise an upper tool part 10 and/or a lower tool part 9.

A foodstuff 3 is already inserted in the packaging 2, which partially fills the packaging 2 to be sealed. Depending on the embodiment of the packaging device 1, a plurality of packagings 2 can be arranged next to/behind each other and sealed simultaneously. Each of the packagings 2 may comprise a trough-shaped lower packaging part 4, onto which a top film 5 is sealed. The sealing is carried out by means of an edge 6 of the lower packaging part 4 and an edge 7 of the top film 5. In the representation according to FIG. 1, the edges 6, 7 are already fixed relative to one another by a clamping strip 11 and a counter-pressure strip 12, while an edge strip perforation 19 in the edge strip 18 of the edge 6 of the lower packaging part 4 is still open.

The edge strip perforation 19 is in communication with a vapor supply line 17, which may be slot-shaped in the edge strip direction so as to be associated with different holes of the edge strip perforation 19. On the opposite side of the packaging 2, the edges 6, 7 are arranged analogously to each other and also there an edge strip perforation 19 is formed in the edge strip 18. This edge strip perforation is in communication with a discharge line 20.

In the region of the edge strip perforation 19, a vapor entry point 13 is formed on the left side of FIG. 1, through which vapor supplied via the vapor supply line 17 enters the interior of the packaging 2. Similarly, on the opposite side of FIG. 1, in the region of the edge strip perforation 19, a vapor outlet point 14 is formed for the vapor to be released into the surrounding atmosphere 15.

The lines—vapor supply line 17 and discharge line 20, respectively—extend partially inside the lower mold part 9, the vapor supply line 17 being connected to a vapor source 16. Via this, vapor, in particular in the form of water vapor, can be supplied to the interior of the packaging 2 in the vapor supply direction 31 accordingly. The discharge line 20 extends laterally away from the lower mold part 9, wherein a Venturi nozzle 21 is arranged in the discharge line 20. This Venturi nozzle 21 is operated in a manner known per se to create a negative pressure with respect to the discharge line 20 so as to provide a suction effect for air, vapor or suitably modified atmosphere within the packaging device 1. Discharge to the surrounding atmosphere 15 is effected via this Venturi nozzle 21.

Furthermore, support devices 28 are arranged within the lower tool part 9, which support the trough-shaped lower packaging part 4 from below. A flat and as complete as possible resting of the lower packaging part 4 on the support device 28 is effected, on the one hand, by a weight of the filled foodstuff 3 and, on the other hand, by a negative pressure formed between the lower side of the lower packaging part 4 and the surface of the lower tool part 9 in a corresponding intermediate space 25 between them. Openings are arranged in each case on both sides of the support device 28, which openings are connected to a discharge line 24. A Venturi nozzle 27 may also be arranged in the latter, in order to produce a negative pressure in the intermediate space 25. A web 32 is arranged between the two support devices 28, which separates two compartments of a packaging 2 or two packagings 2 arranged next to each other. A seal can also be made on the upper side of the web 32 between the lower packaging part and the top film.

The actual sealing of the edges of the lower packaging part 4 and the top film 5 is essentially carried out by means of the interaction of a sealing bar, which is not shown, and edge bars 33 of the lower tool part 9 or upper tool part 10.

The vapor source 16 shown laterally in FIG. 1 generates vapor which is forced into the interior of the packaging 2 with a certain excess pressure in the vapor supply direction 31 via the vapor supply line 17. This takes place via the aforementioned edge strip perforation 19 and the vapor entry point 13 formed thereby. After flowing through the packaging 2, the vapor enters with any remaining atmosphere from the packaging 2 via the further edge strip perforation and outlet point 14 into the discharge line 20 and exits via the latter into the surrounding atmosphere 15.

In particular, in order to be able to maintain a correspondingly large free space in the interior of the packaging 2 during the flow of vapor therethrough, the upper tool part 10 has an opening with a connected suction line 22. This may also be connected to the surrounding atmosphere 15 via a corresponding Venturi nozzle 26. Via the suction line 22, a negative pressure can be generated between the top film and the upper tool part 10, which creates a correspondingly large free space 23 between the lower side of the top film 5 and the upper side of the foodstuff 3. This results in an improved flow of vapor through the interior of the packaging 2.

The Venturi nozzles 21, 26, 27 may all be of substantially similar construction.

Furthermore, a switching valve 29, in particular in the form of a three-way valve or a two-way valve, is arranged in the vapor supply line 17. In the illustrated position of the switching valve 29, vapor is supplied in the vapor supply direction 31 to the interior of the packaging 2. In a further position, the switching valve 29 is in the blocking position, so that no vapor is transported from the vapor source 16 towards the packaging 2. In the last position, the vapor source 16 is disconnected from the vapor supply line 17, but the delivery of vapor takes place, for example, to a further packaging device 1 not shown, or possibly also in such a way that the vapor flows through the packaging 2 in the opposite direction, for example by connecting the vapor source 16 to the outlet point 14 and vapor exits via the vapor inlet point 13 into the surrounding atmosphere.

It is further possible that the trough-shaped lower packaging part 4 is formed from a bottom film 30, analogously to the top film 5. In this case, the lower packaging part is formed by deep-drawing the bottom film 30 before the foodstuff is inserted.

What is claimed is:

1. A packaging device for manufacturing a packaging for a foodstuff, the packaging comprising a trough-shaped lower packaging part and a top film, which can be sealed to one another along their respective edges by means of a sealing tool of the packaging device, the sealing tool comprising a vapor supply line and a discharge line, wherein vapor can be introduced under pressure between the lower packaging part and the top film at least at a vapor inlet point in communication with the vapor supply line before sealing and can be released from the packaging into surrounding atmosphere at an outlet point in communication with the discharge line, and wherein the sealing tool comprises a suction line for providing a negative pressure between the sealing tool and the top film to increase space for vapor flow between the top film and a surface of the foodstuff in the lower packaging part, and wherein the sealing tool comprises an extraction line which connects a space between the sealing tool and the lower packaging part to the surrounding atmosphere.

2. The packaging device according to claim 1, wherein a vapor source is associated with the packaging device and connected to the vapor inlet point via the vapor supply line.

3. The packaging device according to claim 2, wherein a switching valve comprising a three-way valve or two-way valve is arranged in the vapor supply line.

4. The packaging device according to claim 2, wherein the vapor source is a source of water vapor.

5. The packaging device according to claim 1, wherein the edge of the lower packaging part is formed at least in places by an edge strip with an edge strip perforation, wherein at least a part of the edge strip perforation forms the vapor entry point.

6. The packaging device according to claim 5, wherein a further edge strip perforation forms the outlet point.

7. The packaging device according to claim 6, wherein the edge strip perforation for the vapor entry point and the further edge strip perforation for the outlet point are opposite each other relative to the packaging.

8. The packaging device according to claim 1, wherein the outlet point is connected to the surrounding atmosphere via the discharge line and a Venturi nozzle is arranged in the discharge line as a negative pressure means.

9. The packaging device according to claim 1, wherein the discharge line is separate from the vapor supply line.

10. The packaging device according to claim 1, wherein a Venturi nozzle is arranged in the suction line and/or the extraction line.

11. The packaging device according to claim 1, wherein a support device is formed at least in places in the sealing tool for supporting the lower packaging part.

12. The packaging device according to claim 1, wherein the packaging device is configured to receive a plurality of packagings arranged one behind the other and/or side by side.

13. The packaging device according to claim 1, wherein the lower packaging part can be produced by deep-drawing a bottom film.

14. A packaging device for manufacturing a packaging for a foodstuff, wherein the packaging includes a trough-shaped lower packaging part and a top film, the packaging device comprising:
- a sealing tool for sealing the lower packaging part and the top film along their respective edges, wherein the sealing tool comprises a suction line for providing a negative pressure between the sealing tool and the top film to increase space for vapor flow between the top film and a surface of the foodstuff in the lower packaging part, and wherein the sealing tool comprises an extraction line which connects a space between the sealing tool and the lower packaging part to the surrounding atmosphere;
- a vapor supply line configured to introduce vapor under pressure between the lower packaging part and the top film at least at a vapor inlet point before sealing; and
- a discharge line configured to release vapor from the packaging into surrounding atmosphere at an outlet point.

15. A packaging device for manufacturing a packaging for a foodstuff, the packaging comprising a trough-shaped lower packaging part and a top film, which can be sealed to one another along their respective edges by means of a sealing tool of the packaging device, the sealing tool comprising a vapor supply line and a discharge line separate from the vapor line, wherein vapor can be introduced under pressure between the lower packaging part and the top film at least at a vapor inlet point in communication with the vapor supply line before sealing and can be released from the packaging into surrounding atmosphere at an outlet point in communication with the discharge line, and wherein the sealing tool comprises a suction line for providing a negative pressure between the sealing tool and the top film to increase space for vapor flow between the top film and a surface of the foodstuff in the lower packaging part.

16. The packaging device according to claim 15, wherein a vapor source is associated with the packaging device and connected to the vapor inlet point via the vapor supply line.

17. The packaging device according to claim 15, wherein the edge of the lower packaging part is formed at least in places by an edge strip with an edge strip perforation, wherein at least a part of the edge strip perforation forms the vapor entry point.

18. The packaging device according to claim 17, wherein a further edge strip perforation forms the outlet point.

19. The packaging device according to claim 18, wherein the edge strip perforation for the vapor entry point and the further edge strip perforation for the outlet point are opposite each other relative to the packaging.

\* \* \* \* \*

UNITED STATES PATENT AND TRADEMARK OFFICE
CERTIFICATE OF CORRECTION

PATENT NO. : 12,064,926 B2
APPLICATION NO. : 17/530272
DATED : August 20, 2024
INVENTOR(S) : Herbert Kirmse It is certified that error appears in the above-identified patent and that said Letters Patent is hereby corrected as shown below:

In the Claims

Column 6, Lines 50-51, Claim 1:
After "with the discharge line"
Delete "and".

Signed and Sealed this
Twenty-first Day of October, 2025

John A. Squires
*Director of the United States Patent and Trademark Office*